(12) United States Patent
Kato et al.

(10) Patent No.: US 8,912,132 B2
(45) Date of Patent: Dec. 16, 2014

(54) THERMALLY CONDUCTIVE SILICONE GREASE COMPOSITION

(75) Inventors: Tomoko Kato, Ichihara (JP); Kazumi Nakayoshi, Sodegaura (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 80 days.

(21) Appl. No.: 13/806,195

(22) PCT Filed: Jun. 16, 2011

(86) PCT No.: PCT/JP2011/064336
§ 371 (c)(1),
(2), (4) Date: Feb. 19, 2013

(87) PCT Pub. No.: WO2011/162312
PCT Pub. Date: Dec. 29, 2011

(65) Prior Publication Data
US 2013/0137613 A1  May 30, 2013

(30) Foreign Application Priority Data

Jun. 24, 2010  (JP) ................................ 2010-143357

(51) Int. Cl.
| | | |
|---|---|---|
| *C10M 169/04* | (2006.01) | |
| *C10M 125/10* | (2006.01) | |
| *C08K 3/18* | (2006.01) | |
| *C08K 3/22* | (2006.01) | |
| *C08K 3/34* | (2006.01) | |
| *C10M 155/02* | (2006.01) | |
| *C08L 83/04* | (2006.01) | |
| *C09K 5/14* | (2006.01) | |
| *C08G 77/50* | (2006.01) | |
| *C08G 77/20* | (2006.01) | |

(52) U.S. Cl.
CPC ..... *C10M 125/10* (2013.01); *C10M 2229/0425* (2013.01); *C10N 2230/06* (2013.01); *C10M 2229/0475* (2013.01); *C10M 2229/0415* (2013.01); *C10M 155/02* (2013.01); *C08L 83/04* (2013.01); *C09K 5/14* (2013.01); *C10N 2230/02* (2013.01); *C10N 2250/10* (2013.01); *C10M 2229/0435* (2013.01); *C10N 2240/20* (2013.01); *C08G 77/50* (2013.01); *C10M 2201/062* (2013.01); *C08G 77/20* (2013.01)
USPC ............ 508/172; 508/208; 524/432; 524/493

(58) Field of Classification Search
CPC .................. C10M 2229/04; C10M 2229/042; C10M 2229/041; C10M 2229/046; C10M 2201/062
USPC ......................... 508/172, 208; 524/432, 493
See application file for complete search history.

(56) References Cited

U.S. PATENT DOCUMENTS

| | | | |
|---|---|---|---|
| 2004/0254275 A1* | 12/2004 | Fukui et al. .................... | 524/261 |
| 2006/0135687 A1 | 6/2006 | Fukui | |
| 2007/0293624 A1 | 12/2007 | Matsumoto et al. | |
| 2008/0057325 A1 | 3/2008 | Sakurai et al. | |

FOREIGN PATENT DOCUMENTS

| | | |
|---|---|---|
| EP | 1754772 A1 | 2/2007 |
| JP | 2004262972 A | 9/2004 |
| JP | 2008019426 A | 1/2008 |
| JP | 2009138036 A | 6/2009 |
| WO | WO 2009/096436 A1 | 8/2009 |

OTHER PUBLICATIONS

English language abstract for JP 2004262972 extracted from espacenet.com dadtbase on Mar. 1, 2013, 22 pages.
English language abstract for JP 2008019426 extracted from espacenet.com database on Mar. 1, 2013, 22 pages.
English language abstract and translation for JP 2009138036 extracted from PAJ database on Mar. 1, 2013, 52 pages.
International Search Report for Application No. PCT/JP2011/064336 dated Sep. 22, 2011, 4 pages.

* cited by examiner

*Primary Examiner* — Vishal Vasisth
(74) *Attorney, Agent, or Firm* — Howard & Howard Attorneys PLLC

(57) ABSTRACT

A thermally conductive silicone grease composition comprising at least the following components: (A) an organopolysiloxane which is liquid at 25° C. and is represented by the following average compositional formula: $R^1_a SiO_{(4-a)/2}$, where, $R^1$ is a monovalent hydrocarbon group; and "a" is a number ranging from 1.8 to 2.2; (B) a thermally conductive filler composed of constituents ($B_1$) to ($B_3$) given below, wherein: constituent ($B_1$) is spherical aluminum oxide powder with an average particle diameter ranging from 15 to 55 μm; constituent ($B_2$) is spherical aluminum oxide powder with an average particle diameter ranging from 2 to 10 μm; constituent ($B_3$) is aluminum oxide powder with an average particle size not exceeding 1 μm; and (C) an alkoxysilyl-containing organopolysiloxane. The composition, along with high thermal conductivity, possesses excellent handleability and low coefficient of friction.

14 Claims, No Drawings

THERMALLY CONDUCTIVE SILICONE GREASE COMPOSITION

RELATED APPLICATIONS

This application is the National Stage of International Patent Application No. PCT/JP2011/064336, filed on Jun. 16, 2011, which claims priority to and all the advantages of Japanese Patent Application No. 2010-143357, filed on Jun. 24, 2010, the content of which is incorporated herein by reference.

TECHNICAL FIELD

The present invention relates to a thermally conductive silicone grease composition that is characterized by high thermal conductivity, good handleability, and low coefficient of friction.

BACKGROUND ART

In recent years, following an increase in the degree of density and integration of hybrid ICs and printed circuit boards carrying transistors, ICs, memory elements, and other electronic components, various thermally conductive silicone grease compositions have been used to provide high-efficiency heat dissipation from the aforementioned objects. In order to reduce flowability, such thermally conductive silicone grease compositions are filled with thermally conductive fillers. Recently, however, demands have arisen for improving thermal conductivity of the grease by increasing the density of the thermally conductive filler. For example, Japanese Unexamined Patent Application Publication (hereinafter referred to as "Kokai") 2004-262972 discloses a thermally conductive silicone grease composition comprising an organopolysiloxane, a thermally conductive filler, and at least two kinds of methylpolysiloxanes having hydrolysable groups. Furthermore, Kokai 2008-019426 discloses a thermally conductive silicone grease composition comprising an organopolysiloxane having a specific structure, and organopolysiloxane acting as a wetter and having a triorganooxysilyl group on one of its terminals connected through an alkylene group, and a thermally conductive filler. Kokai 2009-138036 discloses a thermally conductive silicone grease composition comprising a siloxane oligomer having trialkoxysilyl groups and alkenyl groups, a thermally conductive filler having three different average particle sizes, a platinum-based catalyst, an organohydrogenpolysiloxane, and an isoparaffin solvent.

However, when in order to improve thermal conductivity the aforementioned thermally conductive silicone grease compositions are compounded with a large amount of a thermally conductive filler, the obtained compositions acquire a high coefficient of friction, and when the filler is supplied through a volumetric feeder, the latter is subject to abrasive wear, and the wear products contaminate the obtained composition.

It is an object of the present invention to provide a thermally conductive silicone grease composition that is characterized by high thermal conductivity, excellent handleability, low coefficient of friction, and especially, of dynamic friction.

DISCLOSURE OF INVENTION

The thermally conductive silicone grease composition of the present invention comprises at least the following components:

(A) 100 parts by mass of an organopolysiloxane which is liquid at 25° C. and is represented by the following average compositional formula:

where, $R^1$ is a monovalent hydrocarbon group; and "a" is a number ranging from 1.8 to 2.2;

(B) 800 to 6,000 parts by mass of a thermally conductive filler composed of constituents $(B_1)$ to $(B_3)$ given below, wherein:

constituent $(B_1)$ is spherical aluminum oxide powder with an average particle diameter ranging from 15 to 55 μm, in an amount of 40 to 80 mass % of component (B);

constituent $(B_2)$ is spherical aluminum oxide powder with an average particle diameter ranging from 2 to 10 μm, in an amount of 5 to 45 mass % of component (B);

constituent $(B_3)$ is aluminum oxide powder with an average particle diameter not exceeding 1 μm, in an amount of 5 to 25 mass % of component (B); and (C) 10 to 300 parts by mass of an organopolysiloxane represented by the following general formula:

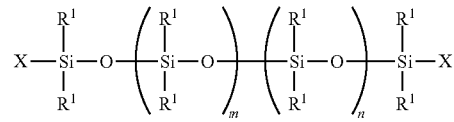

where, $R^1$ designates same or different monovalent hydrocarbon groups; X designates same or different monovalent hydrocarbon groups or an alkoxysilyl-containing group of the following general formula:

where, $R^1$ is the same as defined above, $R^2$ is an oxygen atom or an alkylene group, $R^3$ is an alkyl group; and "b" is an integer from 0 to 2; and "m" and "n" are integers equal to or greater than 0.

Effects of Invention

The thermally conductive silicone grease composition of the invention is characterized by high thermal conductivity, good handleability, and low coefficient of friction, especially of dynamic friction.

DETAILED DESCRIPTION OF THE INVENTION

The thermally conductive silicone grease composition of the invention will now be described in more details.

Component (A) is the main component of the composition. It comprises an organopolysiloxane represented by the following average compositional formula:

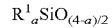

In this formula, $R^1$ is a monovalent hydrocarbon group that can be exemplified by a methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, eicosyl group, or a similar linear alkyl group; an isopropyl group, tertiary butyl group, isobutyl group, 2-methylundecyl group, 1-hexylheptyl group, or a similar branch-chained alkyl group; a cyclopentyl group, cyclohexyl group, cyclododecyl group, or a similar cyclic alkyl group; a vinyl group, allyl group, butenyl group, pentenyl group, hexenyl group, or a similar alkenyl group; a phenyl group, tolyl group, xylyl group, or a similar aryl group; a benzyl group, phenethyl group, 2-(2,4,6-trimethylphenyl)propyl group, or a similar aralkyl group; a 3,3,3-trifluoropropyl group, 3-chloropropyl group, or a similar halogenated alkyl group. Most preferable are alkyl, alkenyl, and aryl groups, especially, methyl, vinyl, and phenyl groups. In the above formula, "a" is a number ranging from 1.8 to 2.2.

There are no special restrictions with regard to the molecular structure of component (A), and it may have a linear, branched, partially branched linear, or a dendrimer-type molecular structure. The linear and the partially branched linear molecular structures are preferable. Component (A) may comprise just a polymer having the aforementioned structure, a copolymer of polymers having the aforementioned structures, or a mixture of such polymers.

Component (A) is liquid at 25° C. Although there are no restrictions with regard to viscosity of component (A) at 25° C., it is recommended to provide viscosity in the range of 100 to 1,000,000 mPa·s, preferably in the range of 200 to 1,000,000 mPa·s, more preferably in the range of 200 to 500,000 mPa·s, and most preferably in the range of 300 to 100,000 mPa·s. If the viscosity at 25° C. is below the recommended lower limit, this may cause bleeding of oil from the composition, and if the viscosity at 25° C. exceeds the recommended upper limit, this will impair handleability of the obtained composition.

Component (A) can be exemplified by the following compounds: dimethylpolysiloxane capped at both molecular terminals with trimethylsiloxy groups; dimethylpolysiloxane capped at both molecular terminals with dimethylvinylsiloxy groups; dimethylpolysiloxane capped at both molecular terminals with methylphenylvinylsiloxy groups; a copolymer of methylphenylsiloxane and dimethylsiloxane capped at both molecular terminals with trimethylsiloxy groups; a copolymer of methylphenylsiloxane and dimethylsiloxane capped at both molecular terminals with dimethylvinylsiloxy groups; a copolymer of methylvinylsiloxane and dimethylsiloxane capped at both molecular terminals with trimethylsiloxy groups; a copolymer of methylvinylsiloxane and dimethylsiloxane capped at both molecular terminals with dimethylvinylsiloxy groups; methyl(3,3,3-trifluoropropyl)polysiloxane capped at both molecular terminals with dimethylvinylsiloxy groups; dimethylpolysiloxane capped at both molecular terminals with silanol groups; a copolymer of methylphenylsiloxane and dimethylsiloxane capped at both molecular terminals with silanol groups; organopolysiloxane composed of siloxane units of formula: $CH_3SiO_{3/2}$ and siloxane units of formula: $(CH_3)_2SiO_{2/2}$; organopolysiloxane composed of siloxane units of formula: $C_6H_5SiO_{3/2}$ and siloxane units of formula: $(CH_3)_2SiO_{2/2}$; organopolysiloxane composed of siloxane units of formula: $(CH_3)_3SiO_{2/2}$; siloxane units of formula: $CH_3SiO_{3/2}$; and siloxane units of formula: $(CH_3)_2SiO_{2/2}$; organopolysiloxane composed of siloxane units of formula: $(CH_3)_3SiO_{1/2}$; siloxane units of formula: $(CH_3)_2(CH_2=CH)SiO_{1/2}$, siloxane units of formula: $CH_3SiO_{3/2}$; and siloxane units of formula: $(CH_3)_2SiO_{2/2}$. The above-mentioned compounds can be mixed in an amount of two or more. When it is necessary to disconnect the composition from a substrate, in order to facilitate such a disconnection, it is recommended to use component (A) as a mixture of an organopolysiloxane ($A_1$) that is free of aryl groups, e.g., dimethylpolysiloxane, with an organopolysiloxane ($A_2$) that contains aryl groups, e.g., methylphenylpolysiloxane or a copolymer of methylphenylsiloxane and dimethylsiloxane.

In this case, the content of constituent ($A_2$) in component (A) should be in the range of 10 to 50 mass %.

Component (B) is an aluminum powder used for imparting thermoconductive properties to the composition of the invention. Component (B) is a mixture of the following constituents:

constituent ($B_1$), which is a spherical aluminum oxide powder with an average particle diameter ranging from 15 to 55 µm, in an amount of 40 to 80 mass % of component (B);

constituent ($B_2$), which is a spherical aluminum oxide powder with an average particle diameter ranging from 2 to 10 µm, in an amount of 5 to 45 mass % of component (B); and constituent ($B_3$), which is aluminum oxide powder with an average particle diameter not exceeding 1 µm, in an amount of 5 to 25 mass % of component (B).

If the content of constituent ($B_1$) in component (B) exceeds the recommended upper limit, the composition will be produced with increase in the coefficient of friction. As a result, if volumetric feeder is used for the supply of the composition to an electronic part, this will cause abrasive wear of the volumetric feeder, and the composition will be contaminated with the products of wear. On the other hand, if the content of constituent ($B_1$) in component (B) is below the recommended lower limit, this will reduce thermal conductivity of the obtained composition. Furthermore, if the content of constituent ($B_2$) in component (B) exceeds the recommended upper limit, the obtained composition will become too viscous, and if the composition is applied by means of volumetric feeder, the increase viscosity will impair efficiency of the composition application operation. If, on the other hand, the content of constituent ($B_2$) is below the recommended lower limit, this will lead to decrease in thermal conductivity of the obtained composition. If the content of constituent ($B_3$) component (B) exceeds the recommended upper limit, this will make the obtained composition too viscous and will impair efficiency of composition application with the use of volumetric feeder. If, on the other hand, the content of constituent ($B_3$) is below the recommended lower limit, this will lead to decrease in thermal conductivity of the obtained composition. Although constituents ($B_1$) and ($B_2$) should comprise spherical powders, particles of constituent ($B_3$) are not necessarily spherical in shape and may comprise crushed, round, or spherical particles.

Component (B) should be added in an amount of 800 to 6,000 parts by mass, preferably 1,000 to 5,000 parts by mass per 100 parts by mass of component (A). This is because if component (B) is used in an amount below the recommended lower limit, this may impair thermal conductivity of the obtained composition. If, on the other hand, component (B) is used in an amount exceeding the recommended upper limit, this will impair handleability of the obtained composition.

Component (C) is used for protecting the composition from decrease in handleability. This component increases the density of filling and comprises an organopolysiloxane of the general formula given below:

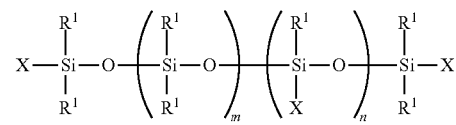

In this formula, $R^1$ designates same or different monovalent hydrocarbon groups that may be exemplified by alkyl, alkenyl, and aryl groups. Most preferable are methyl, vinyl, and phenyl groups. Furthermore, in the above formula, X designates identical or different monovalent hydrocarbon groups or an alkoxysilyl-containing group of the following general formula:

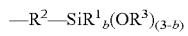

The monovalent hydrocarbon groups of X may comprise the same monovalent hydrocarbon groups as those shown above for $R^1$. Most preferable are alkyl, alkenyl, and aryl groups, especially methyl, vinyl, and phenyl groups. In the above formula of the alkoxysilyl-containing groups of X, $R^1$ is a monovalent hydrocarbon group and is represented by the same examples as were given for $R^1$ earlier; $R^2$ is an oxygen atom or an alkylene group. The alkylene groups of $R^2$ are exemplified by ethylene, propylene, and butylene groups; $R^3$ is an alkyl group such as a methyl, ethyl, or propyl group. The methyl group is preferable. In the formula, "b" is an integer from 0 to 2, preferably 0.

In the formula, "m" is an integer equal to or greater than 0. If in the formula "b" is 0, then "m" is an integer equal to or greater than 1. It is recommended to have "m" in the range of 0 to 500, preferably 1 to 500, more preferably 5 to 500, most preferably 10 to 500, and further preferably 10 to 200. If the value of "m" is below the recommended lower limit, it will be difficult to provide sufficient treatment of the surface of component (B) with component (C). If, on the other hand, the value of "m" exceeds the recommended upper limit, this will impair handleability of the obtained composition. In the above formula, "n" is an integer equal to or greater than 0. It is recommended to have "n" in the range of 0 to 500, preferably 0 to 50, and more preferably 0 to 10. If the value of "n" exceeds the recommended upper limit, this will impair handleability of the obtained composition.

Component (C) can be represented by the following compounds:
an organopolysiloxane of the following general formula:

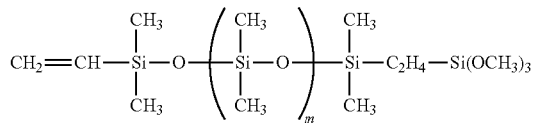

where, "m" is an integer equal to or greater than 0;
an organopolysiloxane of the following general formula:

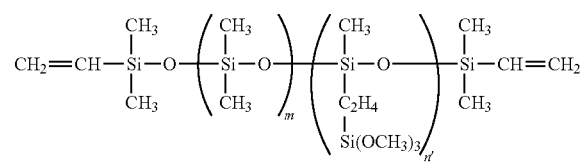

where, "m" is an integer equal to or greater than 0; and "n'" is an integer equal to or greater than 0;
an organopolysiloxane of the following general formula:

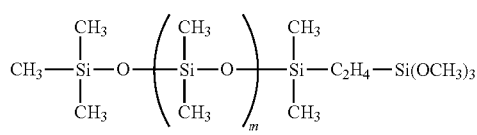

where, "m" is an integer equal to or greater than 0; and an organopolysiloxane of the following general formula:

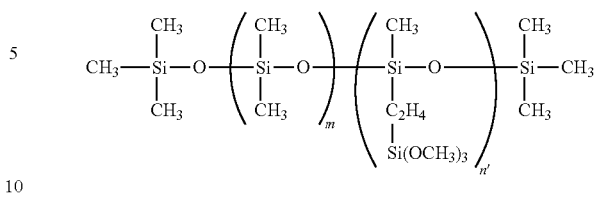

where, "m" is an integer equal to or greater than 0; and "n'" is an integer equal to or greater than 0.

Component (C) is added in an amount of 10 to 300 parts by mass, preferably 20 to 300 parts by mass per 100 parts by mass of component (A). If component (C) is added in an amount less than the recommended lower limit, than, in case of a large amount of component (B), this will impair handleability of the obtained composition. If, on the other hand, component (C) is added in an amount exceeding the recommended upper limit, this will impair thermal resistance of the obtained composition.

Within the limits that are not in contradiction with the objects of the invention, a silica-based filler (D) can be used as an arbitrary additive to the composition. Component (D) can be exemplified, e.g., by fumed silica, fused silica, precipitated silica, or a similar fine silica powder; the same fine silica powder as mentioned earlier hydrophobized by surface treatment with alkoxysilane, chlorosilane, silazane, or a similar organic silicon compound. It is recommended that the BET specific area of component (D) be 50 $m^2$/g or higher, preferably 100 $m^2$/g or higher. If the BET specific area is lower than the recommended lower limit, it will be difficult to restrict separation of component (B) by precipitation.

Component (D) can be added to the composition in an amount of 1 to 50 parts by mass, preferably in an amount of 1 to 30 parts by mass, and more preferably, in an amount of 1 to 15 parts by mass per 100 parts by mass of component (A). If component (D) is added in an amount of less than the recommended lower limit, than in case of low viscosity of the composition, component (B) will be subject to separation by precipitation. If, on the other hand, the content of component (D) exceeds the recommended upper limit, the obtained composition will become too viscous, and this will impair handleability of the composition.

Within the limits that are not in contradiction with the objects of the invention, a silane compound (E) of formula given below, or a partially hydrolyzed product of this compound, can be added to the composition as an arbitrary component:

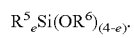

Similar to component (C), without compromising the handleability, component (E) is used for increasing the density of filling of the composition with component (B). In the above formula, $R^5$ designates a monovalent hydrocarbon group, an epoxy-containing organic group, a methacryl-containing organic group, or a acryl-containing organic group. $R^5$ as a monovalent hydrocarbon group can be exemplified by a methyl group, ethyl group, propyl group, butyl group, hexyl group, decyl group, octadecyl group, or a similar linear alkyl group; an isopropyl group, tertiary butyl group, isobutyl group, or a similar branch-chained alkyl group; a cyclohexyl group, or a similar cyclic alkyl group; a vinyl group, allyl group, butenyl group, pentenyl group, hexenyl group, heptenyl group, or a similar alkenyl group; a phenyl group, tolyl group, xylyl group, or a similar aryl group; a benzyl group, phenethyl group, or a similar aralkyl group; a 3,3,3-trifluoropropyl group, 3-chloropropyl group, or a similar halogenated alkyl group. $R^5$ as an epoxy-containing organic group can be represented by a 3-glycidoxypropyl group and a 2-(3,4-epoxycyclohexyl)ethyl group. $R^5$ as a methacryl-containing organic group can be exemplified by a 3-methacryloxypropyl group. $R^5$ as an acryl-containing organic group can be represented by a 3-acryloxypropyl group. In the above formula, $R^6$ designates an alkyl group. $R^6$ is the same alkyl group as defined above for $R^3$. In the formula, "e" is an integer in the range of 1 to 3, preferably 1 or 2, and most preferably 1.

The silane compound of component (E) can be exemplified by the following compounds: methyltrimethoxysilane, methyltriethoxysilane, ethyltrimethoxysilane, n-propyltrimethoxysilane, butyltrimethoxysilane, pentyltrimethoxysilane, decyltrimethoxysilane, octadecyltrimethoxysilane, vinyltrimethoxysilane, vinyltriethoxysilane, methylvinyldimethoxysilane, allyltrimethoxysilane, allylmethyldimethoxysilane, butenyltrimethoxysilane, 3-glycidoxypropyltrimethoxysilane, 3-glycidoxypropylmethyldimethoxysilane, 3-glycidoxypropyltriethoxysilane, 3-methacryloxypropyltrimethoxysilane, 3-methacryloxypropyltriethoxysilane, 3-methacryloxypropylmethyldimethoxysilane, 3-acryloxypropyltrimethoxysilane, and 3-acryloxypropylmethyldimethoxysilane.

Component (E) can be added to the composition in an amount of 1 to 100 parts by mass, preferably 5 to 100 parts by mass, and more preferably, 5 to 50 parts by mass per 100 parts by mass of component (A). If component (E) is added in an amount less than the recommended lower limit, in case of a large amount of component (B), this may increase viscosity of the composition, and thus, either impair handleability of the composition, or cause agglomeration of component (B) and precipitation and separation of component (B) during storage of the composition. If, on the other hand, the content of component (E) exceeds the recommended upper limit, this will increase components that do not contribute to surface treatment of component (B).

The surface of component (B) can be treated with components (C) and (E) by a variety of methods. For example, the surface of component (B) can be first pretreated with component (C) and then treated with component (E); the surface of component (B) can be first pretreated with component (E), and then treated with component (C); the surface of component (B) can be treated simultaneously with components (C) and (E); the surface of component (B) can be pretreated with component (C) in component (A) and then treated with component (E); the surface of component (B) can be pretreated with component (E) in component (A) and then treated with component (C); the surface of component (B) can be treated in component (A) simultaneously with components (C) and (E); component (B) pretreated with component (C) can be treated with component (E) in component (A); or component (B) pretreated with component (E) can be treated with component (C) in component (A). Components (C) and (E) can be introduced into the composition as coatings on the surface of component (B), or can be added to the composition independently. In case the surface of component (B) is treated with components (C) and (E), in order to accelerate the treatment, the process can be carried out with heating.

Furthermore, if it is not in contradiction with the objects of the invention, the composition may be combined with other arbitrary components, e.g., metal oxides other than aforementioned component (B), such as magnesium oxide, titanium oxide, beryllium oxide, zinc oxide, or the like; metal hydroxides such as aluminum hydroxide, magnesium hydroxide, or the like; nitrides such as aluminum nitride, silicon nitride, boron nitride, or the like; carbides such as boron carbide, titanium carbide, silicon carbide, or the like; graphite; metals such as copper, nickel, silver, aluminum, or the like; and fillers that comprise mixtures of the aforementioned components; as well as pigments, dyes, fluorescent substances, heat-resistant additives, agents imparting flame-resistant properties, and plasticizers.

The composition of the invention comprises a thermally conductive silicone grease having thermal conductivity no less than 2 W/m·K.

EXAMPLES

The thermally conductive silicone grease composition of the present invention will now be described in more details with reference to application examples. All characteristics used in these examples have values that correspond to 25° C. The following methods were used for measuring characteristics of the thermally conductive silicone grease compositions.

[Viscosity]

Viscosity of the thermally conductive silicone grease composition was measured by using the rheometer AR550 (the product of TA Instruments Co., Inc.). Measurements were carried out by using 20 mm diameter parallel plates under following conditions: a 200 μm gap; and 10.0 (1/s) shear rate.

[Thermal Conductivity]

The thermally conductive silicone grease composition was loaded into a 60 mm×150 mm×25 mm container, subjected to de-aeration, and after the surface of the composition was coated with a 10 μm thick polyvinylidene chloride film, thermal conductivity of the thermally conductive silicone grease composition was measured through the coating film by a hot-wire method with the use of a Quick Thermal Conductivity Meter (QTM-500) from Kyoto Electronics Manufacturing Co., Ltd.

[Coefficient of Friction]

The coefficient of friction was measured by applying the thermally conductive silicone grease composition in a thin uniform layer onto the surface of a horizontally arranged SUS304 plate and measuring the dynamic friction force under pulling conditions created by contact with a SUS304 plate loaded with a force of 490 mN at a pulling speed of 1200 mm/min.

[Wiping Characteristics]

The thermally conductive silicone grease composition was applied onto the surface of a 1 mm×25 mm×75 mm SUS304 plate in the form of a 1 mm thick layer, the layer was heated for 240 hours at 150° C., then the thermally conductive silicone grease composition was wiped with paper, and the traces of the thermally conductive silicone grease composition left on the surface of the SUS304 plate were observed. The following criteria were used for evaluation:

⊚—no traces of the grease were observed;

○—slight traces of the grease were observed;

X—significant traces were observed.

Application Example 1

The following components were premixed for 30 min. at room temperature and then mixed under reduced pressure for 60 min. with heating at a the temperature of 150° C.: 100 parts by mass of a dimethylpolysiloxane represented by the following formula:

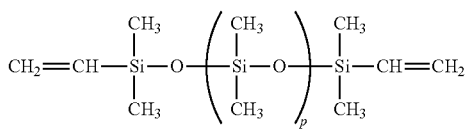

where, "p" is a number obtained at a corresponding viscosity of 2,000 mPa·s;
30 parts by mass of a dimethylpolysiloxane represented by the following formula:

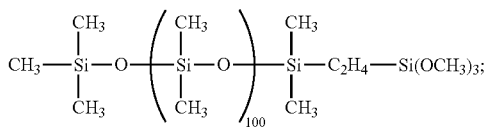

550 parts by mass of spherical aluminum oxide powder having an average particle size of 20 μm; 520 parts by mass of spherical aluminum oxide powder having an average particle size of 3 μm; 220 parts by mass of crushed aluminum oxide powder having an average particle size of 0.4 μm; 4 parts by mass of fumed silica having BET specific area of 200 m²/g and subjected to hydrophobic surface treatment with hexamethyl disilazane; and 10 parts by mass of methyltrimethoxysilane. After the product was cooled to room temperature, a thermally conductive silicone grease composition was obtained.

Application Example 2

The following components were premixed for 30 min. at room temperature and then mixed under reduced pressure for 60 min. with heating at a temperature of 150° C.:
100 parts by mass of a dimethylpolysiloxane represented by the following formula:

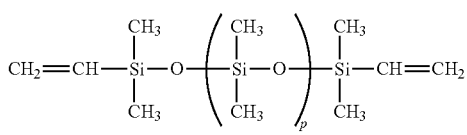

where, "p" is a number obtained at a corresponding viscosity of 400 mPa·s;
20 parts by mass of a methylphenylpolysiloxane represented by the following formula:

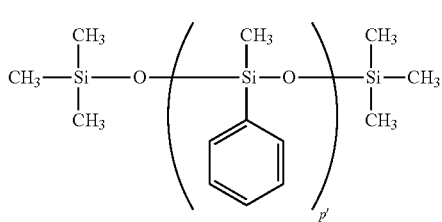

where, "p'" is a number obtained at a corresponding viscosity of 100 mPa·s;
250 parts by mass of a dimethylpolysiloxane represented by the following formula:

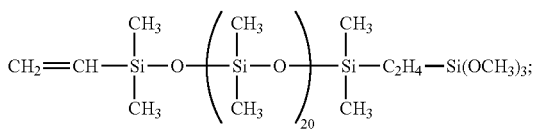

3,400 parts by mass of spherical aluminum oxide powder having an average particle size of 50 μm; 1,500 parts by mass of spherical aluminum oxide powder having an average particle size of 3 μm; 600 parts by mass of crushed aluminum oxide powder having an average particle size of 0.4 μm; 15 parts by mass of fumed silica having BET specific area of 200 m²/g and subjected to hydrophobic surface treatment with hexamethyl disilazane; and 10 parts by mass of methyltrimethoxysilane. After the product was cooled to room temperature, a thermally conductive silicone grease composition was obtained.

Application Example 3

The following components were premixed for 30 min. at room temperature and then mixed under reduced pressure for 60 min. with heating at a temperature of 150° C.:
100 parts by mass of a dimethylpolysiloxane represented by the following formula:

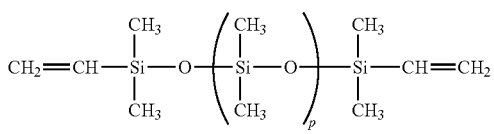

where, "p" is a number obtained at a corresponding viscosity of 50,000 mPa·s;
100 parts by mass of a dimethylpolysiloxane represented by the following formula:

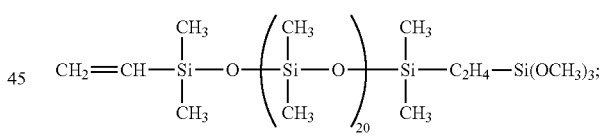

150 parts by mass of a dimethylpolysiloxane represented by the following formula:

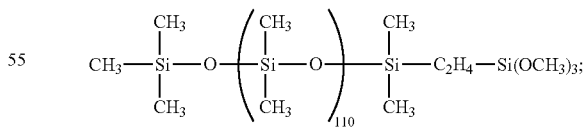

3,000 parts by mass of spherical aluminum oxide powder having an average particle size of 20 μm; 1,200 parts by mass of spherical aluminum oxide powder having an average particle size of 4 μm; 500 parts by mass of fine aluminum oxide powder having an average particle size of 0.4 μm; and 30 parts by mass of methyltrimethoxysilane. After the product was cooled to room temperature, a thermally conductive silicone grease composition was obtained.

Application Example 4

The following components were premixed for 30 min. at room temperature and then mixed under reduced pressure for 60 min. with heating at a temperature of 150° C.:
100 parts by mass of a dimethylpolysiloxane represented by the following formula:

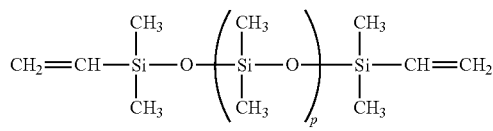

where, "p" is a number obtained at a corresponding viscosity of 400 mPa·s;
60 parts by mass of a methylphenylpolysiloxane represented by the following formula:

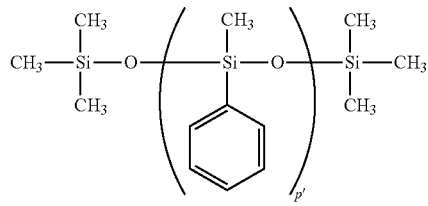

where, "p'" is a number obtained at a corresponding viscosity of 100 mPa·s;
200 parts by mass of a dimethylpolysiloxane represented by the following formula:

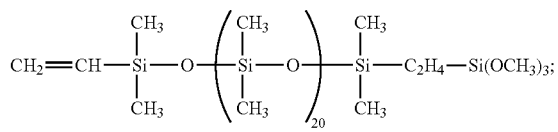

2,800 parts by mass of spherical aluminum oxide powder having an average particle size of 20 μm; 1,200 parts by mass of spherical aluminum oxide powder having an average particle size of 3 μm; 600 parts by mass of crushed aluminum oxide powder having an average particle size of 0.4 μm; and 15 parts by mass of methyltrimethoxysilane. After the product was cooled to room temperature, a thermally conductive silicone grease composition was obtained.

The following components were premixed for 30 min. at room temperature and then mixed under reduced pressure for 60 min. with heating at a temperature of 150° C.:
100 parts by mass of a dimethylpolysiloxane represented by the following formula:

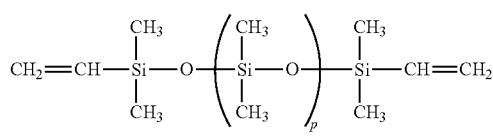

where, "p" is a number obtained at a corresponding viscosity of 2,000 mPa·s;
30 parts by mass of a dimethylpolysiloxane represented by the following formula:

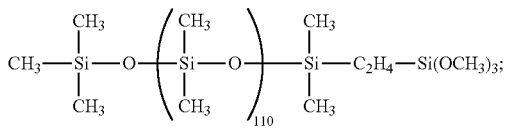

550 parts by mass of aluminum oxide powder having round particles with an average particle size of 18 μm; 520 parts by mass of aluminum oxide powder having round particles with an average particle size of 3 μm; 220 parts by mass of crushed aluminum oxide powder having an average particle size of 0.4 μm; 4 parts by mass of fumed silica having BET specific area of 200 m²/g and subjected to hydrophobic surface treatment with hexamethyl disilazane; and 10 parts by mass of methyltrimethoxysilane. After the product was cooled to room temperature, a thermally conductive silicone grease composition was obtained.

Comparative Example 2

The following components were premixed for 30 min. at room temperature and then mixed under reduced pressure for 60 min. with heating at a temperature of 150° C.:
100 parts by mass of a dimethylpolysiloxane represented by the following formula:

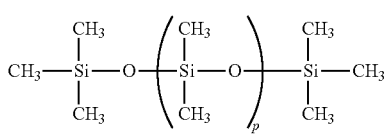

where, "p" is a number obtained at a corresponding viscosity of 300 mPa·s;
30 parts by mass of a dimethylpolysiloxane represented by the following formula:

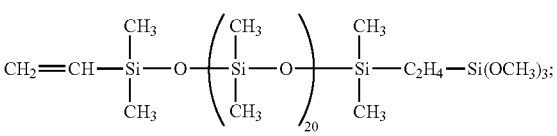

700 parts by mass of an aluminum oxide powder having crushed particles with an average particle size of 3 μm; and 10 parts by mass of methyltrimethoxysilane. After the product was cooled to room temperature, a thermally conductive silicone grease composition was obtained.

Comparative Example 3

The following components were premixed for 30 min. at room temperature and then mixed under reduced pressure for 60 min. with heating at a temperature of 150° C.:
100 parts by mass of a dimethylpolysiloxane represented by the following formula:

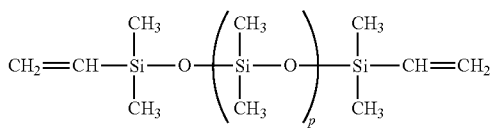

where, "p" is a number obtained at a corresponding viscosity of 400 mPa·s;
50 parts by mass of a dimethylpolysiloxane represented by the following formula:

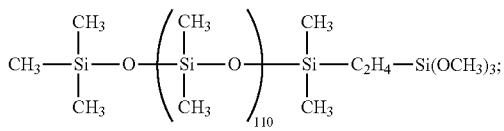

1,140 parts by mass of aluminum oxide powder having round particles with an average particle size of 18 μm; 380 parts by mass of aluminum oxide powder having round particles with an average particle size of 4 μm; and 380 parts by mass of crushed aluminum oxide powder having an average particle size of 0.4 μm. After the product was cooled to room temperature, a thermally conductive silicone grease composition was obtained.

Comparative Example 4

The following components were premixed for 30 min. at room temperature and then mixed under reduced pressure for 60 min. with heating at a temperature of 150° C.:
100 parts by mass of a dimethylpolysiloxane represented by the following formula:

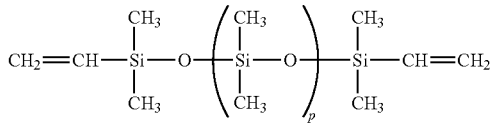

where, "p" is a number obtained at a corresponding viscosity of 400 mPa·s;
2,000 parts by mass of spherical aluminum oxide powder with an average particle size of 20 μm; 880 parts by mass of spherical aluminum oxide powder with an average particle size of 3 μm; 350 parts by mass of crushed aluminum oxide powder with an average particle size of 0.4 μm; 20 parts by mass of methylphenylpolysiloxane; and 50 parts by mass of methyltrimethoxysilane. However, a uniform thermally conductive silicone grease composition was not obtained.

TABLE 11

| | Examples | | | | | | |
| --- | --- | --- | --- | --- | --- | --- | --- |
| | Application Examples | | | | Comparative Examples | | |
| Characteristics | 1 | 2 | 3 | 4 | 1 | 2 | 3 |
| Viscosity (Pa·s) | 315 | 200 | 340 | 180 | 350 | 100 | 420 |
| Thermal conductivity (W/m·K) | 2.9 | 4.8 | 4.5 | 4.2 | 2.9 | 1.8 | 4.4 |

TABLE 11-continued

| | Examples | | | | | | |
| --- | --- | --- | --- | --- | --- | --- | --- |
| | Application Examples | | | | Comparative Examples | | |
| Characteristics | 1 | 2 | 3 | 4 | 1 | 2 | 3 |
| Coefficient of dynamic friction | 0.5 | 0.4 | 0.6 | 0.4 | 1.0 | 0.5 | 1.5 |
| Wiping properties | ○ | ◉ | ○ | ◉ | X | ○ | X |

INDUSTRIAL APPLICABILITY

Since the thermally conductive silicone grease composition of the present invention is characterized by high thermal conductivity, excellent handleability, low coefficient of friction, and since it does not cause contamination of the composition with products of wear when the composition is handled with volumetric feeder, it is suitable for use in conjunction with electronic equipment that contains heat-generating components and electronic equipment for vehicle that operates under high-temperature conditions.

The invention claimed is:
1. A thermally conductive silicone grease composition comprising the following components:
(A) 100 parts by mass of an organopolysiloxane which is liquid at 25° C. and is represented by the following average compositional formula:

$$R^1_a SiO_{(4-a)/2}$$

where, $R^1$ is a monovalent hydrocarbon group and "a" is a number ranging from 1.8 to 2.2, wherein component (A) comprises an organopolysiloxane ($A_1$) that is free of aryl groups and organopolysiloxane ($A_2$) that contains aryl groups, and wherein the content of constituent ($A_2$) in component (A) is in the range of 10 to 50 mass %;
(B) 800 to 6,000 parts by mass of a thermally conductive filler composed of constituents ($B_1$) to ($B_3$) given below, wherein:
constituent ($B_1$) is spherical aluminum oxide powder with an average particle diameter ranging from 15 to 55 μm, in an amount of 40 to 80 mass % of component (B);
constituent ($B_2$) is spherical aluminum oxide powder with an average particle diameter ranging from 2 to 10 μm, in an amount of 5 to 45 mass % of component (B);
constituent ($B_3$) is aluminum oxide powder with an average particle diameter not exceeding 1 μm, in an amount of 5 to 25 mass % of component (B); and
(C) 10 to 300 parts by mass of an organopolysiloxane represented by the following general formula:

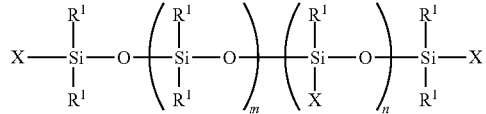

where, $R^1$ designates same or different monovalent hydrocarbon groups; X designates identical or different monovalent hydrocarbon groups or an alkoxysilyl-containing group of the following general formula:

$$—R^2—SiR^1_b(OR^3)_{(3-b)}$$

where, $R^1$ is the same as defined above, $R^2$ is an oxygen atom or an alkylene group, $R^3$ is an alkyl group; and "b" is an integer from 0 to 2; and "m" and "n" are integers equal to or greater than 0.

2. The thermally conductive silicone grease composition of claim 1, wherein component (A) has viscosity at 25° C. in the range of 100 to 1,000,000 mPa·s.

3. The thermally conductive silicone grease composition of claim 1, further comprising a silica-based filler (D) in an amount of 1 to 50 parts by mass per 100 parts by mass of component (A).

4. The thermally conductive silicone grease composition of claim 1, further comprising a silane compound (E) of the formula given below or a partially hydrolyzed product of said compound:

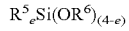

where, $R^5$ designates a monovalent hydrocarbon group, an epoxy-containing organic group, a methacryl-containing organic group, or an acryl-containing organic group; and $R^6$ designates an alkyl group; and "e" is an integer ranging from 1 to 3, in an amount of 1 to 100 parts by mass per 100 parts by mass of component (A).

5. The thermally conductive silicone grease composition of claim 1, wherein component (A) has viscosity at 25° C. in the range of 300 to 100,000 mPa·s.

6. The thermally conductive silicone grease composition of claim 1, wherein component (A) is capped at each molecular terminal with at least one siloxy group.

7. The thermally conductive silicone grease composition of claim 4, wherein the surface of component (B) is treated with component (C) and component (E).

8. A thermally conductive silicone grease composition comprising the following components:
(A) an organopolysiloxane which is liquid at 25° C. and is represented by the following average compositional formula:

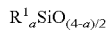

where, $R^1$ is a monovalent hydrocarbon group; and "a" is a number ranging from 1.8 to 2.2;
(B) a thermally conductive filler composed of constituents $(B_1)$ to $(B_3)$ given below, wherein:
constituent $(B_1)$ is spherical aluminum oxide powder with an average particle diameter ranging from 15 to 55 μm;
constituent $(B_2)$ is spherical aluminum oxide powder with an average particle diameter ranging from 2 to 10 μm;
constituent $(B_3)$ is aluminum oxide powder with an average particle diameter not exceeding 1 μm; and
(C) an organopolysiloxane represented by the following general formula:

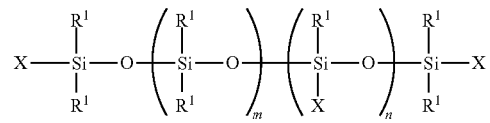

where, $R^1$ designates same or different monovalent hydrocarbon groups; X designates identical or different monovalent hydrocarbon groups or an alkoxysilyl-containing group of the following general formula:

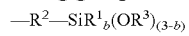

where, $R^1$ is the same as defined above, $R^2$ is an oxygen atom or an alkylene group, $R^3$ is an alkyl group; and "b" is an integer from 1 to 2; and "m" and "n" are integers equal to or greater than 0.

9. The thermally conductive silicone grease composition of claim 8, wherein component (A) has viscosity at 25° C. in the range of 300 to 100,000 mPa·s.

10. The thermally conductive silicone grease composition of claim 8, wherein component (A) comprises an organopolysiloxane $(A_1)$ that is free of aryl groups and organopolysiloxane $(A_2)$ that contains aryl groups.

11. The thermally conductive silicone grease composition of claim 8, further comprising a silica-based filler (D) and a silane compound (E) of the formula given below or a partially hydrolyzed product of said compound:

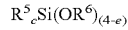

where, $R^5$ designates a monovalent hydrocarbon group, an epoxy-containing organic group, a methacryl-containing organic group, or an acryl-containing organic group; and $R^6$ designates an alkyl group; and "e" is an integer ranging from 1 to 3.

12. The thermally conductive silicone grease composition of claim 8, wherein component (A) is capped at each molecular terminal with at least one siloxy group.

13. The thermally conductive silicone grease composition of claim 11, wherein the surface of component (B) is treated with component (C) and component (E).

14. The thermally conductive silicone grease composition of claim 1, further comprising a silane compound (E) of the formula given below or a partially hydrolyzed product of said compound:

where, $R^5$ designates an epoxy-containing organic group or an acryl-containing organic group; and $R^6$ designates an alkyl group; and "e" is an integer ranging from 1 to 3, in an amount of 1 to 100 parts by mass per 100 parts by mass of component (A).

* * * * *